(12) United States Patent
Freeman et al.

(10) Patent No.: US 6,402,827 B1
(45) Date of Patent: *Jun. 11, 2002

(54) PAPER OR PAPER BOARD COATING COMPOSITION CONTAINING A STRUCTURED CLAY PIGMENT

(75) Inventors: Gary M. Freeman, Macon, GA (US); Sung-Tsuen Liu, Laguna Niguel, CA (US)

(73) Assignee: J.M. Huber Corporation, Edison, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,542

(22) Filed: Mar. 10, 2000

Related U.S. Application Data

(63) Continuation-in-part of application No. 09/144,872, filed on Sep. 1, 1998, now Pat. No. 6,156,117.

(51) Int. Cl.[7] .............................. C09C 1/42; C09C 1/40; C09C 1/00
(52) U.S. Cl. ..................... 106/487; 106/486; 106/416
(58) Field of Search ................................ 106/416, 486, 106/487; 162/181.8

(56) References Cited

U.S. PATENT DOCUMENTS

| | | |
|---|---|---|
| 4,072,537 A | 2/1978 | Kurrle |
| 4,075,030 A | 2/1978 | Bundy et al. |
| 4,076,548 A | 2/1978 | Bundy et al. |
| 4,078,941 A | 3/1978 | Bundy et al. |
| 4,117,191 A | 9/1978 | Kurrle |
| 4,722,332 A | 2/1988 | Saggers |
| 4,738,726 A | 4/1988 | Pratt et al. |
| 4,767,466 A | 8/1988 | Nemeh et al. |
| 4,816,074 A | 3/1989 | Rayhatha et al. |
| 4,859,246 A | 8/1989 | Sennet |
| 4,943,324 A | 7/1990 | Bundy et al. |
| 5,186,746 A | 2/1993 | Freeman |
| 5,232,495 A | 8/1993 | Shurling, Jr. et al. |
| 5,236,989 A | 8/1993 | Brown et al. |
| 5,336,311 A | 8/1994 | Curtis et al. |
| 5,352,287 A | 10/1994 | Wason et al. |
| 5,551,975 A | 9/1996 | Freeman et al. |
| 5,584,925 A | 12/1996 | Maxwell et al. |
| 5,591,256 A | 1/1997 | Freeman et al. |
| 5,631,080 A | 5/1997 | Fugitt |
| 5,653,795 A * | 8/1997 | Brown ...................... 106/416 |
| 5,676,746 A | 10/1997 | Brown |
| 5,676,747 A | 10/1997 | Brown |
| 5,676,748 A * | 10/1997 | Brown ...................... 106/416 |
| 5,718,756 A | 2/1998 | Mohler |
| 6,156,117 A * | 12/2000 | Freeman et al. ............. 106/487 |

FOREIGN PATENT DOCUMENTS

| | | |
|---|---|---|
| EP | 0 274 430 A2 | 7/1988 |
| EP | 0 602 326 A1 | 6/1994 |
| WO | WO 96/32448 | 10/1996 |
| WO | WO 98/36029 | 8/1998 |

* cited by examiner

*Primary Examiner*—Michael Marcheschi
(74) *Attorney, Agent, or Firm*—Carlos Nieves; David Mitchell Goodrich

(57) ABSTRACT

A coating composition for paper or paperboard products comprising a structured pigment. The structured pigment includes a plurality of chemically treated mineral particles. The mineral particles have a Malvern median particle size of about 0.3 microns to about 3.5 microns. The Malvern median particle size of the treated particles is less than 20% greater than the Malvern median particle size of the mineral particles prior to treatment.

17 Claims, 2 Drawing Sheets

PAPER OR PAPER BOARD COATING COMPOSITION CONTAINING A STRUCTURED CLAY PIGMENT

RELATED APPLICATION

The present application is a continuation-in-part of U.S. patent application Ser. No. 09/144,872, filed Sept. 1, 1998 U.S. Pat. No. 6,156,117.

BACKGROUND OF THE INVENTION

1. Technical Field

This invention relates to a paper or paper board coating composition containing a structured clay pigment and, more particularly, to such a coating that includes a structured clay pigment that increases the bulking characteristics and opacity of the coating without a detrimental effect on paper gloss.

2. Background Description

Fine particle size pigments, e.g. fine particle size kaolin clays, have been widely used in paper and paperboard coating formulations to provide desirable levels of gloss and opacity. However, such pigments often contain a substantial amount of ultrafine particles that are smaller than the wavelength of visible light and do not scatter light efficiently. Accordingly, such fine particle clay pigments yield lower coating opacity (also referred to as hiding power and contrast ratio) than clays of more optimal particle size.

In recognition of the foregoing, methods for increasing the light scattering ability of fine clay pigments have been developed. One such method involves structuring the clay pigment by chemical or thermal means. The objective in structuring a clay pigment is to provide microvoid pore structure via clay platelet aggregation and to aggregate the ultrafine particle fraction within the pigment (e.g., particles having a particle size of less than 0.2 microns) into structured particles of more optimal particle size with respect to light scattering efficiency. In high gloss applications, the chief technical challenge still confronting the use of clay structuring strategies is the ability to improve the physical and optical characteristics of the coating pigment without hurting sheet gloss.

Several techniques have been developed to form a structured clay from a fine particle clay feed to improve the opacity thereof. Examples of these techniques include calcination of fine particle clays, hydrothermal alteration of clay particles and chemical treatment of clay particles. Two common structured pigments used in paper coatings are structured calcined clays and synthetic alkali metal aluminosilicate (SAMS) compositions.

The calcination of fine particle clays at temperatures of close to 1000° C. results in aggregation of the clay particle platelets, via thermal sintering, to form structured products that provide increased coating opacity. See, for example, U.S. Pat. Nos. 3,014,836 and 4,381,948.

U.S. Pat. Nos. 4,812,299, 4,863,796, 5,112,402, 5,186, 746, and 5,316,576 each discloses a SAMS composition. SAMS pigments are structured clay compositions that are produced from the reaction of a kaolin clay with an inorganic base under hydrothermal conditions as generally disclosed in U.S. Pat. Nos. 4,812,299, 4,863,796, and 5,591, 256.

It has been discovered that most calcined clays tend to be too abrasive to be used effectively in some paper-related applications. Further, existing calcined clays and SAMS compositions cannot be dispersed at high solids without structure loss and, therefore, exhibit poor high shear rheology. Moreover, such products are expensive to manufacture.

In recognition of the foregoing, methods of producing high performance, structured pigments with improved rheology and lower production costs have been developed. One such method involves treating the ultrafine particles in a kaolin (aluminosilicate) clay pigment with a flocculating agent in order to incorporate microvoid pore structure into the clay platelet aggregation. As stated above, the microvoids associated with structured pigments are responsible for providing desirable bulking and light scattering characteristics a pigmented coating. See, for example, U.S. Pat. Nos. 4,075,030, 4,076,548, and 4,078,941. These patents disclose increasing the opacifying power of kaolin clay pigments by flocculating the clay particles with a non-polymeric, polyamine aggregating agent at a low slurry pH. However, such structured pigments, when "made down" into a slurry, do not have acceptable end-use properties for application in conventional paper coating compositions which are typically formulated at neutral to slightly alkaline pH values.

U.S. Pat. No. 4,738,726 discloses a method of treating a clay with a cationic flocculent in order to obtain a high bulking pigment with improved Theological properties. However, the Sedigraph mean particle size (i.e., the average Stokes Equivalent Particle Diameter) of the kaolin clay pigment disclosed is 0.5 to 0.6 microns, prior to treatment, with less than 35% by weight of particles finer than 0.3 microns. After flocculation the particle size is substantially increased. This substantial increase in particle size causes the structured pigment to be ineffective as a component in paper coatings when high gloss is required.

U.S. Pat. No. 5,676,748 discloses a method for producing bulking and opacifying kaolin pigments as wet-end fillers for paper. Specifically, an aqueous slurry of anionically dispersed kaolin particles is treated at low solids with high treatment levels of a low-to-medium weight cationic polymer which serves as a flocculent. The resultant aggregate structures contain little or no fine and ultra-fine particles and such structures contain a high number of internal voids or pores. However, once again, as a result of a drastic change in the particle size of the kaolin clay particles, the optical properties of the treated pigments are adversely affected when made down and added to a paper coating. Further, the structured clay pigments so provided can only be produced at low slurry solids (less than about 30%) which is unacceptable for use as a coating pigment in conventional paper coating applications.

U.S. Pat. No. 5,718,756 also discloses a method for manufacturing a structured paper coating which includes mixing a fine particle size kaolin clay pigment with a cationic flocculant, a nonionic binder and other additives. The cationic flocculant is added at a relatively high level and is thereby believed to create a relatively large increase in the mean particle size of the pigment. Further, while the rheological or optical properties of the resulting paper coating are not disclosed, the substantial increase in the particle size of the pigment is believed to hurt the glossing properties of the same.

SUMMARY OF THE INVENTION

The present invention is designed to overcome the deficiencies of the prior art discussed above. It is an object of the invention to provide a paper coating composition that includes a structured clay pigment that increases the bulking characteristics and opacity of the coating composition without having a detrimental effect on gloss characteristics of the same.

It is a further object of the invention to provide such a coating composition that includes a structured clay pigment that is utilized as a slurry product having a high percentage of solid mineral particles and desirable rheological properties.

In accordance with the illustrative embodiments and demonstrating features of the present invention, there is provided a coating composition for paper or paperboard products comprising a structured pigment. The structured pigment slurry includes a plurality of chemically treated mineral particles. The mineral particles have a Malvern median particle size of about 0.3 microns to about 3.5 microns. The Malvern median particle size of the treated particles is less than 20% greater than the Malvern median particle size of the mineral particles prior to treatment.

Other objects, features, and advantages will be readily apparent from the following detailed description of preferred embodiments thereof.

DETAILED DESCRIPTION OF PREFERRED EMBODIMENTS

In accordance with the present invention, structured pigment products containing chemically treated mineral particles and having improved rheological and optical characteristics are disclosed. Methods of preparing such structured pigment products are also disclosed.

The present invention sets forth two preferred treatment strategies for preparing a chemically treated, structured pigment product. The first strategy is utilized to produce a structured clay slurry via polycationic polymer treatment of a high solids clay slurry feed. The second strategy is designed to yield a dry, polymer structured clay product which can be transported in dry bulk form to a customer location and which can be subsequently made down into a high solids slurry for desired end-use application, i.e., in a paper or paperboard coating composition.

Figure 1:
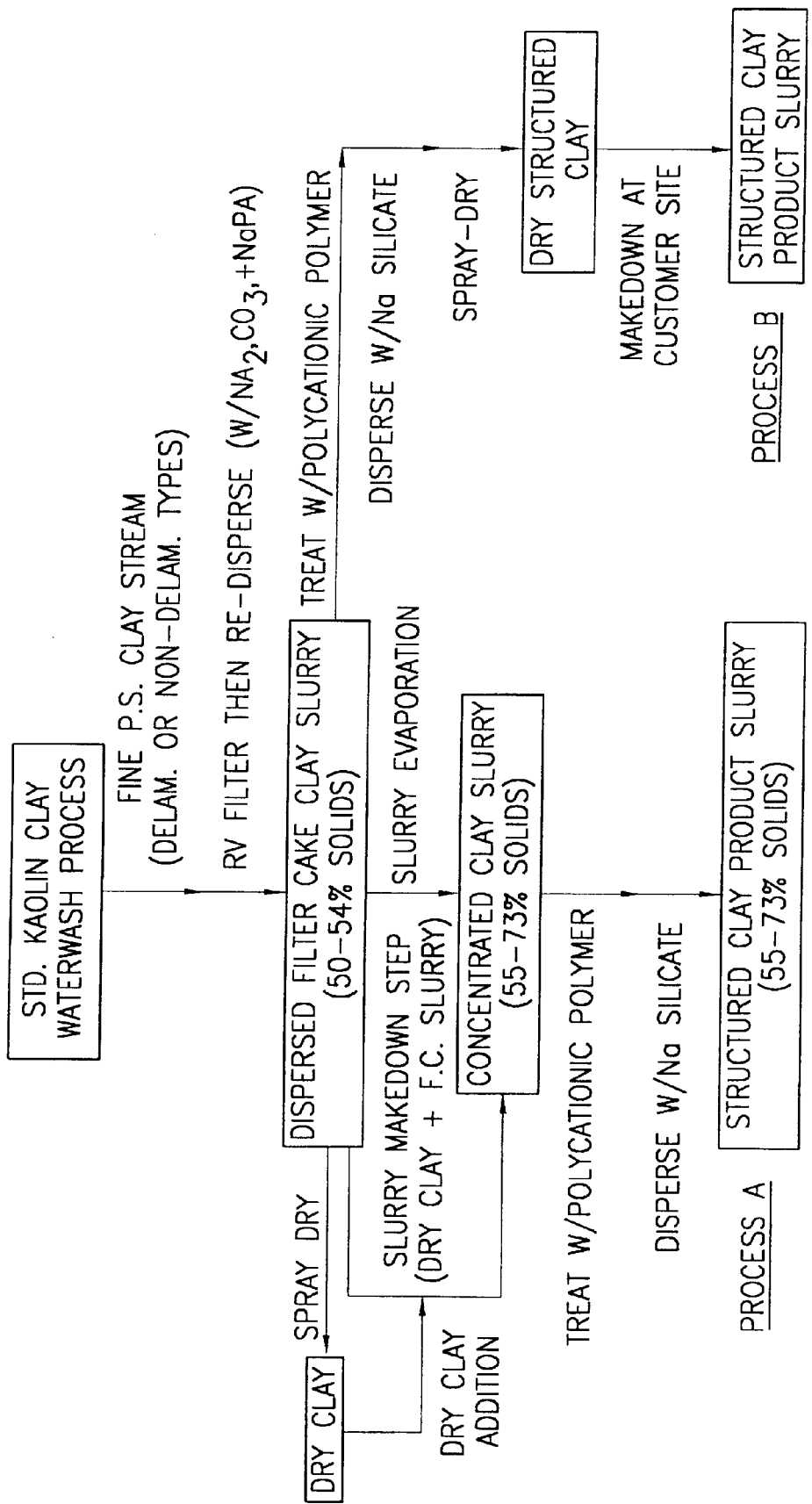
FIG. 1 is flow diagram setting forth the process for preparing a polymer treated structured clay product slurry and a polymer treated dry structured clay product in accordance with the present invention.

A preferred method of preparing a high solids, preferred structured clay product slurry is set forth in FIG. 1. The method, which is identified as Process A in FIG. 1, includes providing a quantity of fine particle size clay feed. The clay feed is slurried or obtained as a slurry process stream from a clay beneficiation plant and then concentrated to a high % solids by conventional means known in the art. The final % solids to be polymer treated is preferably from about 55% to about 75%. As will be discussed, product slurry solids greater than 62% are particularly desirable for most paper coating applications. Thereafter, the slurry is blended with a predetermined amount of polycationic polymer. The resultant treated slurry product is then dispersed with a liquid dispersant. The addition of the post-treatment dispersant is needed to control the particle size of the polymer treated clay, to reduce slurry product viscosity and to provide long term slurry stability.

The initial clay feed is preferably a fine particle size, coating-grade clay that preferably has a TAPPI brightness of at least 85% and may consist of a non-delaminated or delaminated version. The particle size properties of a preferred non-delaminated fine particle clay feed are as follows: Malvern (LLS) median particle size of 0.3 to 1.4 microns; (2) Sedigraph median particle size (avg. stokes diameter) of 0.2 to 0.5 microns, and Sedigraph wt. % <2 microns of 92–100 and Sedigraph wt. % <0.3 microns greater than 35%. The particle size properties of a preferred delaminated clay feed are as follows: Malvern (LLS) median particle size of 1.8 to 3.4 microns; Sedigraph median particle size (Avg. Stokes Diameter) of 0.4 to 0.7 microns, and Sedigraph wt. % <2 microns of 82 to 96%. It should be noted that other useful mineral-based products include ground calcium carbonate and blends of calcium carbonate and clay.

Two preferred, non-delaminated kaolin clays are sold by J.M. Huber Corporation of Edison, N.J. under the marks Hydragloss® 90 and Covergloss®. Two preferred delaminated clay feedstocks include Hydrafine® 90 and Lithoprint™ that are also available from J.M. Huber Corporation. Some typical physical properties of each of these clays are set forth in Table I.

TABLE I

| Clay | Hydra-gloss ® 90 | Cover-gloss ® | Hydrafine ® 90 | Lithoprint ™ |
| --- | --- | --- | --- | --- |
| TAPPI Brightness, % | 91 | 90 | 90 | 89.5 |
| Malvern Median Particle Size, µm | 0.50 | 1.2 | 2.1 | 3.0 |
| Sedigraph Median Particle Size, % | 0.20 | 0.40 | 0.50 | 0.60 |
| Sedigraph particle size, wt. % < 2 µm | 99 | 96 | 93 | 85 |
| pH (@ 28% solids) | 7.0 | 7.0 | 7.0 | 7.0 |

The pH, brightness, Sedigraph particle size and Malvern particle size were determined as follows. Clay pH values were determined using a standard pH meter on a 28% solids (by weight) mixture of the clay with deionized water in accordance with the ASTM-D1208, E-70 procedure. The % brightness values are standard TAPPI brightness numbers as determined with a Technidyne Micro TB-1C brightness meter in accordance with the TAPPI Method T646 om-86 procedure. All Sedigraph particle size measurements were made via a x-ray sedimentation method based on Stokes Law using a Micromeritics 5100 Sedigraph Unit. The Malvern median particle size was obtained by using Malvern's Masterizer/E unit which is based on a laser light scattering method described in U.S. Pat. No. 5,167,707.

The fine particle size of the clay translates to high sheet gloss when used as a component of a paper coating. Sheet gloss refers to surface luster and connotes a generally pleasing effect. Inventive products are particularly useful in medium (Light Weight Coated paper with gloss of 50–55) to high gloss (free sheet grades with gloss of 70–90) coated papers. Paper gloss is determined according to TAPPI method T480 om-85. The clay feedstock is slurried to a desired % solids or obtained as a slurry process stream from a clay beneficiation plant whereby the clay slurry preferably contains at least 50% solids by weight and is anionically dispersed. The slurry is then concentrated by evaporation or filtration techniques to provide a high solids, clay slurry feed (preferably from about 50% to 75% solids). Thereafter, the concentrated clay slurry is treated with a polycationic polymer. This is preferably accomplished by mixing the clay slurry in a high-shear blend tank (e.g., Cowles dissolver operating at a tip speed of at least 2,000 fpm) and slowly mixing in the cationic polymer under continuous agitation.

The cationic polymer used to impart pigment structure is preferably added in an amount of about 0.01 to about 0.1% by weight and has a molecular weight of less than 50,000 and, more preferably, less than 15,000 as determined by weight average GPC methodology. Typically, the polycationic polymer is added slowly under high shear mixing to the clay slurry as a dilute solution that can range in active polymer concentration of from about 2 to 10% by weight. The use of dilute polymer concentrations for clay treatment helps avoid shocking the clay slurry due to excessive localized clay flocculation. Clay solids dilution from polymer treatment is still almost negligible given the low treatment levels being employed. It should be noted that higher levels of polymer treatment can be employed if treating clay slurries of lower % solids, i.e., lower than 50% solids. However, to effectively produce high performance, structured clay pigments having final slurry solids contents in the range of 55% to 75%, the polymer treatment levels should be in the range of about 0.01 to about 0.1%.

A sufficient amount of polycationic polymer is added to yield the maximum clay structuring level while still maintaining an acceptable viscosity value after post-treatment dispersion with a chemical dispersant. An acceptable treated slurry is one that has an initial Brookfield. (BF) viscosity of less than 500 cps (#2 spindle at 20 rpm) and that is also stable (i.e., non-gelling) with long term aging. It is also desirable for the treated product slurry to have a high-shear Hercules viscosity value of better than 18 dynes @ 500 rpm as measured with the A-Bob. A Hercules viscosity better than 18 dynes @ 500 rpm ensures that the treated product slurry can be pumped with high speed centrifugal pumps and the like.

Preferred polycationic polymers include those having a molecular weight, as determined by GPC (Gel Permeation Chromatography) methodology, of <50,000 and, even more preferably, <15,000. A highly effective polycationic polymer is available from CPS Chemical Company, Inc. under the trade name B50-LV. B50-LV is a low molecular weight (about 8,500 by GPC) polycationic polymer based on dimethylamine epichlorohydrin chemistry. The B50-LV polymer has been found to yield significant increases in clay bulking, as measured by wet void volume determinations, while causing minimal increases in treated product median particle size relative to the median particle size of the starting clay as more fully explained below. Another suitable dimethylamine epichlorohydrin based polymer is available under the name Flocmaster 5310 from Rhone-Poulenc (molecular weight of about 12,000 by GPC). Typically, such polycationic polymers are commercially supplied as reagent solutions having 40–50% active polymer weight concentrations; however, for clay treatment purposes they are normally diluted to a polymer concentration of about 2–10% by weight. The dimethylamine epichlorohydrin polymers may be represented by the following formula:

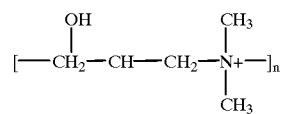

It should be noted that a variety of other similar low molecular weight, high charge density, polycationic polymers could be utilized such as a diallyldimethyl quaternary ammonium chloride based polymer manufactured by Calgon under the trade name Calgon Variken. This polymer is believed to possess a molecular weight in the range of 5000 to 10000 (as reported by Calgon).

After polycationic treatment, the structured clay slurry is subsequently dispersed with a chemical dispersant in order to control the resultant particle size of the polymer structured clay, to reduce slurry product viscosity and to provide long term slurry stability. Inorganic anionic dispersants, such as liquid sodium silicates, are preferably employed as the post-treatment dispersant.

The liquid sodium silicate is added into the same high-shear blend tank where the polymer treatment was first conducted in an amount required to yield a stable, non-gelling slurry product with an initial Brookfield viscosity (#2 spindle @ 20 rpm) of about 150 to 500 cps. Up to 0.4% by weight of active dispersant on a dry clay basis may be added for post-treatment dispersion. However, all that is necessary is an amount sufficient to bring the structured slurry product to or near the requisite BF Viscosity. The resultant Brookfield viscosity of the structured product slurry is typically 75 to 100 cps higher than the BF viscosity of the starting clay slurry feed. It should be noted that the present polymer treatment process also slightly increases the Hercules high shear viscosity of a given fine particle size clay, but to a much lesser degree than other known structuring processes.

Liquid sodium silicates such as PQ Corporation's 3.22 weight ratio N product, are preferred chemical dispersants as more fully explained below. Sodium silicates varying in $SiO_2/Na_2O$ weight ratio from 1:1 to 4:1 can be utilized. It should be noted that variety of other inorganic dispersants, such as sodium aluminates, phosphates and the like, that are stable and that do not adversely affect the structure of the pigment, also could be utilized.

Brookfield viscosity and the long-term stability of these treated slurries are also important characteristics of the structured clay slurry. The type of chemical dispersant added to the structured clay is a significant factor in terms of controlling final pigment particle size, reducing the product's Brookfield viscosity to a manageable level (preferably 150 to 500 cps via a #2 spindle at 20 rpm) and in yielding a slurry product exhibiting desirable stability (non-gelling) with extended aging. It has been found that there are significant advantages to utilizing sodium silicates over conventional anionic dispersants such as sodium polyacrylates.

Table II sets forth the comparative Brookfield viscosities (#2 spindle @ 20 rpm) of a polymer treated Hydragloss® 90 slurry. The clay slurry feed contained 65% solids and was treated with CPS B50-LV polymer under high shear mixing conditions with a 0.0375% addition level using a Cowles dissolver unit. Once processed, the polymer treated clay slurry was divided into two equal fractions and each fraction was subsequently dispersed with a sufficient amount of one of the dispersants to yield a minimum, acceptable BF viscosity (150 to 500 cps). The dispersants used were Rhone-Poulenc's Colloid 211 (a low molecular weight sodium polyacrylate dispersant) and N sodium silicate available from the PQ Corporation (a 3.22:1 SiO$_2$/Na$_2$O wt. ratio liquid sodium silicate).

TABLE II

| Time (days) | Disp. W/Colloid 211 (@ 0.0175%) | Disp. w/N sodium silicate (@ 0.094%) |
|---|---|---|
| 0 | 300 | 160 |
| 7 | 4960 | 400 |
| 17 | Gelled | 425 |

The viscosity data of Table II illustrates that both types of chemical dispersants initially can disperse the polymer treated clay slurry although a lower minimum BF viscosity was realized when the N sodium silicate was utilized. More importantly, the N sodium silicate was found to provide significantly better slurry stability with aging. The requisite amount of dispersant to be added is dependent on the specific clay, the slurry solids content and the polymer treatment level employed in the polymer structuring process. Typically the dispersant can be added in an amount up to 0.40% by weight of active dispersant on a dry clay basis, although additions up to 0.25% by weight are more typical and preferred. As stated above, the dispersant only has to be added in an amount sufficient to bring the structured slurry product to or near the minimum, acceptable Brookfield Viscosity. It should be noted that over dispersion may have a negative impact on the structured clay product's opacity performance.

FIG. 1 also sets forth a process, identified as Process B, for yielding a dry, structured clay product which can be transported in dry bulk form to a customer location and can then be subsequently made-down into a high solids slurry for end-use application. This is accomplished by treating the slurried feedstock (50–54% solids) with the polycationic polymer. The treated slurred product is then dispersed with sodium silicate and spray dried to yield a dry structured clay which can be readily transported and can be subsequently made down. The spray drying step in Process B is carried out under typical commercial drying conditions, wherein inlet air temperatures of about 400 to 650° C. and outlet air temperatures of about 100 to 130° C. are employed. The resultant treated structured clay product preferably has a free moisture content of less than 1.0 wt. %.

Figure 2:
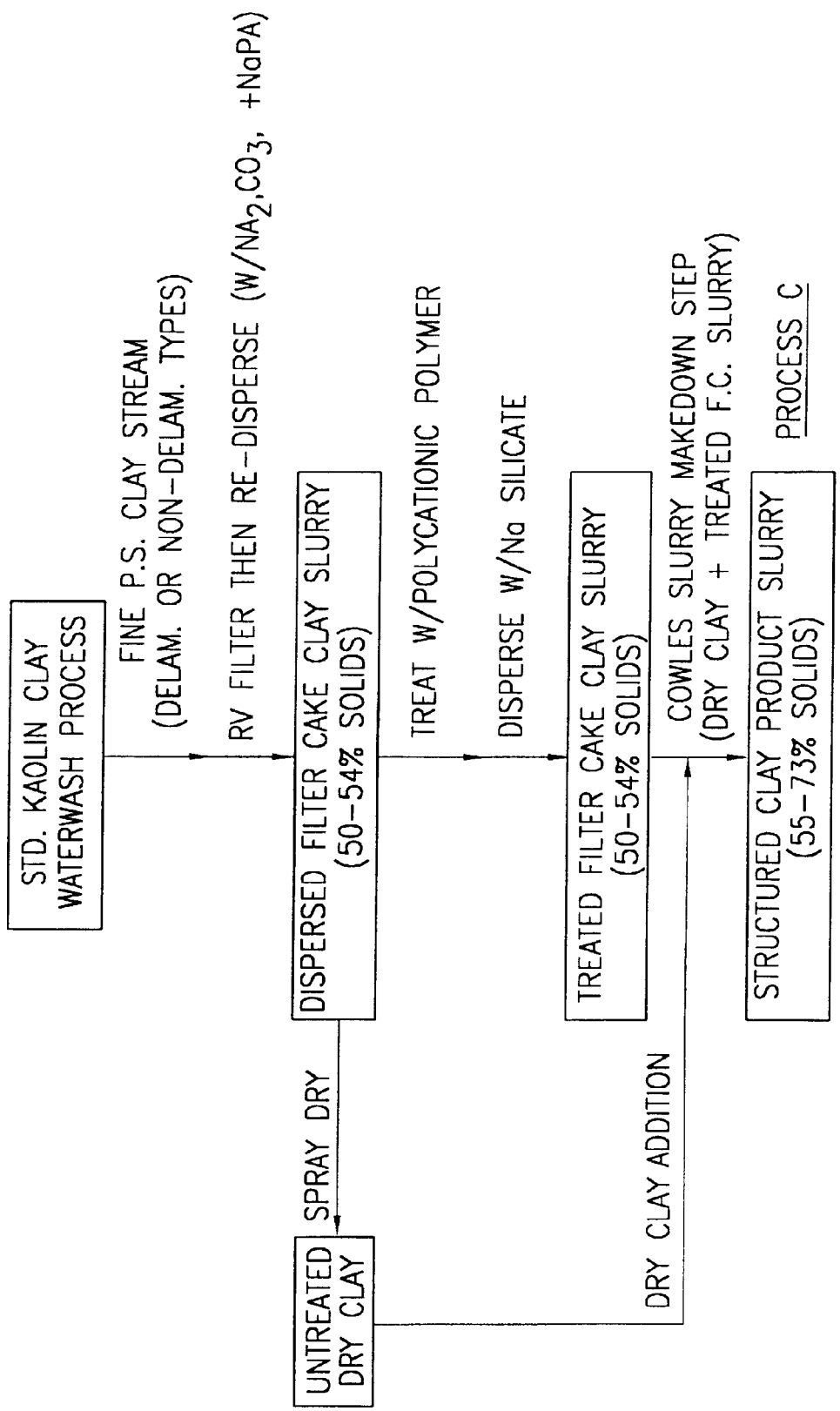
FIG. 2 is a flow diagram setting forth an alternate method of preparing a polymer treated structured clay product slurry.

FIG. 2 discloses an alternate process (identified as Process C) for producing a structured clay product slurry. This process is similar to Process A described above except that the slurried feedstock is not concentrated prior to polymer treatment. The advantage of Process C is that the polymer treatment step can be carried out more quickly. However, the addition rate of the polycationic polymer has to be more carefully monitored to avoid any intermittent gellation problems.

Table II compares the performance differences between structured Hydragloss® 90 products made in accordance with Process A and Process C described above and illustrated in FIGS. 1 and 2.

TABLE III

| Sample Description | Treatment Process | Method of Treatment | Malvern Median P.S., μm | BF Visc., cps @ 20 rpm | Hercules Visc. (A-Bob), dynes | Coating Contrast Ratio (10 rod) |
|---|---|---|---|---|---|---|
| 70% solids, Hydragloss 90 | None | Untreated | 0.4 | 380 | 1.5 @ 1100 rpm | 71.5 |
| 65% solids, Hydragloss 90 with 0.038% CPS B50-LV + 0.064% N sodium silicate | Process A (FIG. 1) | Direct treat at 65% solids with the polymer and dispersant | 0.41 | 165 | 0.96 @ 1100 rpm | 73.9 |
| 65% solids, Hydragloss 90 with 0.038% CPS B50-LV + 0.064% N sodium silicate | Process C (FIG. 2) | Treat 52% solids clay slurry with 0.0643% CPS B50-LV + 0.16% N sodium silicate; then makedown to final slurry solids of 65% by adding untreated dry clay | 0.41 | 230 | 1.28 @ 1100 rpm | 74.0 |

The Malvern median particle size data was obtained in an equivalent manner as described above. The coating contrast ratio values were obtained using a standard drawdown test on Leneta black/white cards in a manner known in the art. Specifically, the various clay slurry products were diluted by to 50% solids to which 10 parts of Dow 620 latex binder (per 100 parts of active clay) was added with good mixing. Each clay/latex combination was mixed with a lab Lightning mixer at low shear for approximately 5 minutes. Thereafter, ammonium hydroxide was then added to adjust the pH of the slurry to above 8.5 and ASE-60 thickener was then added in order to raise the Brookfield Viscosity to between 500 and 1000 cps. The resultant coating compositions were then drawn down on the Leneta cards using a 10 rod and subsequently air dried in order to make the required optical readings. Contrast ratio is a measure of coating opacity, with higher values indicating greater coverage capability.

Table III indicates that at equivalent polymer treatment levels, virtually equivalent physical properties and coating performance were obtained independent of the process method employed to make the polymer structured clay products. Although relatively small in magnitude, the most significant difference is seen in the BF viscosity value. However, the equivalent coating performance of the two structured products strongly suggest that the treatment polymer is able to redistribute itself over the total number of clay particles present such that virtually equivalent types of clay structuring are ultimately obtained.

The treatment of the kaolin clay particles with the low molecular weight polycationic polymer, like CPS B50-LV, has been shown to selectively flocculate (or aggregate) the fine particle size particles in the clay without significantly increasing the median particle size of the clay as a whole. The minimal increase in particle size is attributed to the preferential micro-flocculation of the ultrafine particle fraction that takes place when the particles are treated with the low molecular weight polymer. Prior known treatments of kaolin clay particles with cationic polymers result in significant increases in particle size (macroflocculation) and, therefore, have a negative impact on the sheet gloss properties of the pigmented paper coating. The micro-flocculation in the present invention results in only a minor increase in the clay pigments median particle size. It should be noted that other chemical and/or processing means could be employed to treat the kaolin clay particles and selectively flocculate the fine particle size particles without significantly increasing the median particle size of the clay. For example, the fine particle fraction could be mechanically separated out by means of a high speed centrifuge where after this fine fraction is treated with either conventional cationic or anionic polymers to structure these fine particles prior to recombination with the coarse fraction clay. Such polymers would typically have a molecular weight of greater than 50,000. A significant advantage of the present invention is that selective flocculation of the fine clay particles can be accomplished in a single simplified processing step involving polymer treatment.

Table IV sets forth some comparative properties of various polymer treated Hydragloss® 90 clay pigments.

weight concentration of about 3%. After each polymer treatment, N sodium silicate was added in order to control the resultant particle size of the structured clay product and to disperse the structured clay product to a desired viscosity. The median clay particle size data of Table IV indicates that the Hydragloss® 90 slurries treated with the low molecular weight polycationic polymers CPS B50-LV and Flocmaster 5310, molecular weight ~8500 and ~12,000 respectively, underwent a high level of structuring as reflected by the treated clay's high relative sedimentation volume (RSV) values and the improved contrast ratio properties.

The relative sedimentation volume of the treated and untreated clay was obtained in the following manner. The clay product slurry was diluted back to a solids content of 30% and 14 ml of the 30% clay suspension was introduced into a 15 ml centrifuge tube. The tube was then centrifuged at 2000 rpm for 3 hours. Thereafter, the sedimentation volume was measured. The void volume per unit weight of clay was then calculated by the following equation:

void volume/unit weight of clay=(sedimentation volume−(total weight of dry clay/clay density))/total weight of clay void volume (ml) /unit weight of clay (g)=(sedimentation volume−(5.13 grams/2.6))/5.13

High values for wet void volume/unit weight of clay are important as they indicate high levels of bulking resulting from the incorporation of microvoid pore structure. This pore structure can translate to desirable optical properties

TABLE IV

| Sample | Description | RSV, ml | Wet Void Volume, ml/g | Clay Slurry Viscosity | | Malvern median particle size, μm | Coating contrast ratio (10 rod) |
| --- | --- | --- | --- | --- | --- | --- | --- |
| | | | | BF Visc., cps @ 20 rpm | Hercules Visc. (A-Bob), dynes | | |
| A | 65% solids, Hydragloss 90, untreated | 3.4 | 0.28 | 165 | 0.77 @ 1100 rpm | 0.45 | 71.53 |
| B | 55% solids, Hydragloss 90, 0.075% CPS B50-LV + 0.094% N sodium silicate | 3.9 | 0.38 | 40 | 0.34 @ 1100 rpm | 0.50 | 74.82 |
| C | 55% solids, Hydragloss 90, 0.075% Flocmaster 5310 + 0.094% N sodium silicate | 3.9 | 0.38 | 45 | 0.39 @ 1100 rpm | 0.44 | 74.2 |
| D | 55% solids, Hydragloss 90, 0.11% Flocmaster 5311* + 0.103% N sodium silicate | 3.9 | 0.38 | 60 | 0.48 @ 1100 rpm | 0.75 | 73.45 |
| E | 55% solids, Hydragloss 90, 0.2% X-WK-06** + 0.15% N sodium silicate | 4 | 0.39 | 125 | 0.62 @ 1100 rpm | 7.0 | 73.09 |
| F | 55% solids, Hydragloss 90, 0.13% Calgon 261-LV*** + 0.131% N sodium silicate | 3.8 | 0.36 | 150 | 0.6 @ 1100 rpm | 5.92 | 72.95 |
| G | 55% solids, Hydragloss 90, 0.045% Calgon Variken**** + 0.075% N sodium silicate | 3.9 | 0.38 | 90 | 0.34 @ 1100 rpm | 0.42 | 72.36 |

*Flocmaster 5311 is a medium molecular weight (~28,000 by GPC) dimethylamine epichlorohydrin based polymer available from Rhone-Poulenc
**X-WK-06 is a high molecular weight dimethylamine epichlorohydrin based polymer available from Rhone-Poulenc (MW ~400,000 as reported by Rhone-Poulenc)
***Calgon 261-LV is a medium molecular weight, dimethyl diallyl quaternary ammonium chloride based polymer (MW ~44,000 by GPC) available from Calgon Corporation
****Calgon Variken is a low molecular weight dimethyl diallyl quaternary ammonium chloride based polymer available from Calgon Corporation (MW = 5,000–10,000 as reported by Calgon)

In each polymer treatment test set forth in Table IV, 1818 grams of Hydragloss® 90 clay (on dry wt. basis) was utilized at 55% solids. The pH of each clay slurry was about 7 and was mixed with polycationic polymer under high shear using a Cowles dissolver unit. The various polymers were each added slowly in diluted form at an active polymer such as light scattering and the like if it is of the appropriate pore diameter size. It has been determined that pigment porosity introduced into a coating having an average pore diameter size of around 0.3 microns is most optically efficient since such air filled pores are roughly half the wavelength of visible light (see U.S. Pat. No. 5,186,746).

The RSV value or wet void volume for a given mineral pigment is a measure of how densely the individual particles from an aqueous suspension have been packed together once completely settled into a wet sediment. The more compact or denser the mineral sediment is the less wet void volume there will be in the sediment. Wet void volume results from imperfect particle packing due to the shape(s) of the various particles present. Structured pigment particles, given their high porosity characteristics, have been shown to provide a high wet void volume content which is reflected in a higher RSV value for a given weight amount of mineral pigment tested. Therefore, RSV values (or the related wet void volume values per gram of dry pigment) can provide a relative measure of a mineral pigment's overall bulking ability or its porosity/structure level. The introduction of air microvoids into a paper coating through the use of structured, porous pigments is a well-known means of improving light scattering efficiency which translates to increased opacity.

In conducting the drawdown tests in Table IV, both the treated and untreated Hydragloss® 90 clay products were subsequently diluted to 50% slurry solids. 10 parts of Dow 620 latex binder (per 100 parts of active clay) was added with good mixing (mixed with a Lightnin mixer at low shear for ~5 minutes). The pH of the slurry was adjusted to above 8.5 by using ammonium hydroxide. An ASE-60 thickener was added to the slurry while the same was being mixed in order to obtain a Brookfield viscosity of between 500 and 1000 cps. After such a viscosity was obtained, the resultant coating compositions were then drawn down on Leneta black/white cards using a 10 rod and subsequently air dried in order to determine the contrast ratios of the samples. Contrast ratio is a measure of coating opacity, with higher values indicating greater coverage capability.

The term micro-flocculation has been used to describe this clay/polymer structuring obtained when employing low molecular weight polycationic polymers, such as CPS B50-LV and Flocmaster 5310, since a minimal change in the clay's median particle size is obtained. Structuring with the low molecular weight polycationic polymers yielded the greatest improvements in coating contrast ratio relative to the untreated Hydragloss® 90. In contrast, the clays treated with the medium to high MW polymers (i.e., Flocmaster 5311, X-WK-06 and Calgon 261-LV) yielded structured clay products of significantly coarser particle size versus the control sample (see Table IV). Samples B, C, D and E of Table IV demonstrate the deleterious effect on resultant coating coverage as the treatment polymer's molecular weight is increased and, in particular, as the treatment polymer's molecular weight is increased above 15,000 within the family of dimethylamine epichlorohydrin polymers tested.

It should be noted that although the Calgon Variken polymer used in Sample G of Table III also has a low molecular weight (<10,000) and accordingly provides a high RSV value with a minimal change in the final treated product particle size. However, the resultant structured clay produced from the Calgon Variken polymer yielded only a modest improvement in contrast ratio relative to those provided by the CPS B50-LV or the Flocmaster 5310 polymer treated pigments. This large difference in coating coverage/opacity is believed to be due to differences in polymer chemistry. Specifically, the Variken polymer is a dimethyl diallyl quaternary ammonium chloride based polycationic polymer whereas the CPS B50-LV and Flocmaster 5310 polymers are dimethylamine epichlorohydrin based polymers. It is apparent that the structured clays treated with the CPS B50-LV and Flocmaster 5310 polymers are more efficient in scattering light. It follows that such polymers flocculate the clay particles in such a way as to produce porosity (i.e., internal pore structure) that is more optically efficient. In particular, pores having a pore diameter size of about 0.3 microns have been previously shown to be optically efficient.

The addition levels for these low molecular weight polycationic polymers required for maximum clay structuring without gelling are significantly less than for the polycationic polymers outside the scope of this invention. When polymer treating fine particle clay slurries of about 50 to 75% solids, the required addition levels for these polymers generally falls into the range of about 0.01 to 0.10% by weight of active polymer on a dry clay basis. As shown in Table IV, the polymer addition levels needed with higher molecular weight polycationic polymers are significantly higher and they often exceed addition levels of 0.1% by weight to yield the maximum level of clay structuring.

Table V displays the minimal increase in median particle size of several different clays treated with a low molecular weight cationic polymer in accordance with the process described above and identified as Process A in FIG. 1.

TABLE V

| Clay Feed | Initial (LLS Malvern) Median P.S., $\mu$m | Polymer treatment (in active wt. %) | Median P.S. (LLS Malvern) of treated clay, $\mu$m | % Change in Median P.S. |
|---|---|---|---|---|
| Clay Treatments Within Scope of the Present Invention | | | | |
| Cover-gloss | 1.17 | 0.05% B50-LV+ 0.30% N silicate @ 65% clay solids | 1.13 | −3.4 |
| Litho-print | 2.86 | 0.04% B50-LV + 0.30% N silicate @ 65% clay solids | 3.01 | 5.2 |
| Litho-print | 2.86 | 0.0250% B50-LV + 0.011% N Silicate @ 68% clay solids | 2.93 | 2.4 |
| Hydra-gloss 90 | 0.46 | 0.0375% B50-LV + 0.094% N silicate @ 65% clay solids | 0.48 | 4.3 |
| Hydra-gloss 90 | 0.44 | 0.0375% B50- LV + 0.056%N silicate @ 65% clay solids | 0.48 | 9.1 |
| Hydra-gloss 90 | 0.44 | 0.0375% Flocmaster 5310 + 0.056% N silicate @ 65% clay solids | 0.48 | 9.1 |
| Other Polymer Treatments | | | | |
| Hydra-gloss 90 | 0.44 | 0.0625% Flocmaster 5311 + 0.113% N silicate @ 65% clay solids | 0.65 | 48 |

TABLE V-continued

| Clay Feed | Initial (LLS Malvern) Median P.S., μm | Polymer treatment (in active wt. %) | Median P.S. (LLS Malvern) of treated clay, μm | % Change in Median P.S. |
|---|---|---|---|---|
| Hydragloss 90 | 0.44 | 0.08% Calgon 261 + 0.113% N silicate @ 65% clay solids | 2.38 | 441 |

As can be seen from Table V, fine particle size pigments treated with low molecular weight polycationic polymers (i.e., molecular weight of 15,000 or less) exhibit only a slight change in median particle size. The resultant change in Malvern median particle size is generally less than about 20% and, more preferably, less than about 10% relative to the median particle size of the starting clay feedstock. Such a minimal change in particle size results in no significant reduction in sheet gloss. However, bulking and, therefore, opacity is significantly increased when the resulting structured pigment is incorporated into a paper coating.

One of the key advantages of the structuring technology described above is the relative simplicity of the polymer treatment process. After adding the post-treatment dispersant, the polymer treated slurry products can be used for paper coating applications without the need for further processing steps. Additionally, the long term stability and the desirable Brookfield Viscosity are also advantageous from a transit and/or storage viewpoint.

Table VI sets forth some tests results of polymer structured products made from different fine particle clay pigments. Delaminated and non-delaminated types of fine particle clays were examined. Each of the structured slurries disclosed in Table VI was produced via a Cowles dissolver at a pH of 7.0. Each clay feedstock slurry was polymer treated under high shear. mixing with a 0.038% addition level of CPS B50-LV polymer. After polymer treatment, the structured product slurries were then dispersed with an effective amount of N sodium silicate to bring the product slurry to minimum BF viscosity.

TABLE VI

| Sample | Description | Clay Slurry Viscosity | | Malvern median particle size, μm | Coating contrast ratio (10 rod) |
| | | BF Visc., cps @ 20 rpm | Hercules Visc. (A-Bob), dynes | | |
|---|---|---|---|---|---|
| H | 70% solids, Hydragloss 90, untreated | 380 | 1.5 @ 1100 rpm | 0.44 | 71.0 |
| I | 65% solids, Hydragloss 90, 0.038% CPS B50-LV + 0.094 % N sodium silicate | 160 | 1.0 @ 1100 rpm | 0.45 | 73.6 |
| J | 70% solids, Covergloss, untreated | 145 | | 0.99 | 74.3 |
| K | 65% solids, Covergloss, 0.038% CPS B50-LV + 0.094 % N sodium silicate | 175 | 18 @ 885 rpm | 0.91 | 77.3 |
| L | 65.7% solids, Lithoprint, untreated | 140 | | 3.43 | 70.37 |
| M | 65.5% solids, Lithoprint, 0.038% CPS B50-LV + 0.094 % N sodium silicate | 190 | 18 @ 610 rpm | 3.41 | 72.39 |

The coating contrast ratio results clearly indicate that the opacity performance of each test clay was improved significantly through polymer structuring. Further, in each test case, the structured product slurry yielded acceptable low and high shear viscosities at % solids of greater than about 62%. Specifically a Brookfield viscosity (as measured with a #2 spindle at 20 rpm) of less than 500 cps and a Hercules viscosity reading of better than 18 dynes @ 500 rpm (as measured with the A-Bob) were obtained. It is important to note that the Malvern median particle size values were only slightly different from those measured on the starting clay feeds. Changes in the Malvern median particle size were quite small, the largest being on the order of only 10%

It should also be noted that it is desirable to have such high product slurry solids (i.e., >62%) with acceptable viscosity readings as the resultant paper coating compositions require high solids in order to achieve coating immobilization after its application to the paper or board substrate (i.e., the applied coating doesn't wick or run) as well as to yield subsequent efficient drying of the coated paper. Acceptable rheology and runnability characteristics at high solids are particularly necessary when high speed coating machines are employed in the application of the coating composition to the paper or paper board substrate.

As a result of their inherent solids limitations. heretofore known structured pigment slurries, such as SAMS or calcined clay pigment slurries, can only be added to coating compositions at % solids of up to about 50 to 55%. If the % solids is increased beyond 55%, undesirable high-shear viscosities would result. Accordingly, only a small amount of such previously known structured pigments can be utilized in a coating composition for improving its bulking and opacifying properties in order to maintain desirable rheology and runnability characteristics.

Table VII demonstrates the coating performance properties of coatings prepared with untreated Hydragloss®t 90, blends of Hydragloss® 90 and Hycal® calcined clay, and polycationic, polymer treated Hydragloss® 90 clay. Hycal® is a high brightness, fully calcined kaolin clay product by J.M. Huber Corporation. The blending of small amounts of calcined clay pigments, on the order of 5–25% of the total pigment content, with coating grade kaolin clays is a well known product strategy in the art for increasing bulking and improving the net scattering efficiency of a clay based paper coating. Calcined clays, such as Hycal®, are thermally structured clay pigments, but they are significantly coarser in median particle size than the polymer structured clays of this invention.

TABLE VII

|  | Hydragloss 90, untreated 70% solids | Slurry blend of 10% Hycal and 90% Hydragloss 90 | Slurry blend of 20% Hycal + 80% Hydragloss 90 | 65% solids, Hydragloss 90 treated w/ 0.038% B50-LV + 0.094% N sodium silicate | 68% solids, Hydragloss 90 treated w/ 0.0333% B50-LV + 0.083% N sodium silicate |
|---|---|---|---|---|---|
| Paper Coating Composition (in active parts by wt.) | | | | | |
| Clay | 100 | 100 | 100 | 100 | 100 |
| SBR Latex (Dow 620) | 12 | 12 | 12 | 12 | 12 |
| Starch | 3 | 3 | 3 | 3 | 3 |
| Ca Stearate | 0.5 | 0.5 | 0.5 | 0.5 | 0.5 |
| Performance Data for Coated Paper | | | | | |
| Coat wt., lb./ream | 6.0 | 6.0 | 6.0 | 6.0 | 6.0 |
| Opacity, % | 81.90 | 82.3 | 82.7 | 82.5 | 82.4 |
| Paper Gloss, % | 68.7 | 67.6 | 66.4 | 69.1 | 69 |
| Print Gloss @ 1.5 OD, % | 69.9 | 70.1 | 69.5 | 70.9 | 70.4 |
| Brightness, % | 68.8 | 69.4 | 69.5 | 69.8 | 69.2 |
| Whiteness Index | 47.8 | 48.7 | 50 | 49.9 | 49.7 |
| IGT-low oil (cm/sec) | 62 | 74 | 78 | 50 | 53 |
| K&N: % retained | 87.8 | 87.3 | 84 | 86 | 87.3 |

The coating compositions set forth in Table VII were applied at a coat weight of 6.0 lb./ream to a 28 lb./ream basestock using a CLC pilot coater operating at a speed of about 4,000 rpm. The coating performance data of Table VII clearly indicates that the polycationically polymer treated clays yield a level of opacity greater than that provided by a 10% addition of Hycal® calcined clay to Hydragloss®t 90. Accordingly, the structured pigment had a positive effect on the opacity of the coating composition. Coating brightness and whiteness properties were also substantially improved over the Hydragloss® 90 control composition. Further, the use of the polymer treated clays did not have a "detrimental effect" on the paper gloss of the resultant coating composition, whereas the addition of Hycal® (given its coarser particle size properties) was observed to hurt paper gloss depending on its level of use. In particular, a 20% addition level of Hycal® calcined clay was noted to decrease paper gloss by more than 2 percentage points which is considered significant. Paper gloss was determined utilizing TAPPI procedure T 480 om-85 the results of which are expressed in per cent reflectance by comparison with standards of known gloss furnished by the National Bureau of Standards.

The use of a treated pigment is deemed to have a "positive effect" on the opacity of a coating composition if it causes an increase in opacity of at least about 0.5 percentage points as compared to a similar coating composition that contains an untreated version of the pigment in the same proportions. The use of a treated pigment is deemed to have a "detrimental effect" on the paper (sheet) gloss of a coating composition if the resultant paper gloss measurement is more than 2 percentage points lower than the paper gloss measurement of a similar coating composition that contains an untreated version of the same pigment in the same proportions.

It should be noted that reductions in paper gloss are particularly significant to coating compositions for paper or paperboard substrates that require medium to high gloss (i.e., gloss values greater than 45%). Accordingly, using addition levels of structured pigments for improving opacity that will in turn have a detrimental effect on paper gloss is generally not desirable for such coating compositions. Conventional structured pigments, such as calcined clays and the like, are commonly used in coating formulations at pigment addition levels less than 20% of the total pigment content therein to minimize their deleterious effect on paper gloss.

In addition to maintaining paper (sheet) gloss, the polymer structured clays were noted to modestly improve print gloss in the coating compositions set forth in Table VII.

Table VIII compares the coating performance properties of a polymer structured Covergloss® clay versus that provided by an untreated Covergloss® clay control as pigmentary components of an air knife coating composition that was applied to a base coated, natural kraft paperboard.

TABLE VIII

|  | 70% solids, Covergloss (untreated control) | 65% solids, Covergloss treated w/0.038% CPS B50-LV + 0.056% N sodium silicate |
|---|---|---|
| Coating Composition (in active parts by wt.) | | |
| Clay | 84 | 84 |
| TiO$_2$ | 16 | 16 |
| R&H 3103 | 18.5 | 18.5 |
| ADM 2100 | 2.6 | 2.6 |
| Sunrez 700C | 0.35 | 0.35 |
| Coating Composition Properties | | |
| Solids, % | 51.9 | 53.3 |
| BF Visc. @ 20 rpm, cps | 1300 | 1650 |
| Hercules Visc. (A-Bob), dynes | 3 | 3.5 |
| Performance Data for Coated Paper | | |
| Brightness, % | 82.4 | 83.8 |
| IGT-med. Oil (ft./min) | 427 | 381 |
| Paper Gloss, % | 30.7 | 30 |

TABLE VIII-continued

|  | 70% solids, Covergloss (untreated control) | 65% solids, Covergloss treated w/0.038% CPS B50-LV + 0.056% N sodium silicate |
|---|---|---|
| Varnish Gloss @ 75°, % | 90.7 | 93.8 |
| Varnish Brightness, % | 78.2 | 79.2 |
| Coated brightness before varnish, % | 82.2 | 83.4 |
| Print Gloss @ 1.0 OD, % | 59.7 | 61.6 |
| K&N: % Retained | 78 | 75.1 |
| Scat. Coef M$^2$/kg @ 4.0 #/MSF | 154 | 175 |

Table VIII indicates that the polymer structured clay provides improved opacifying properties as compared to the untreated control. The increase in opacity is reflected by its higher coating brightness values before and after varnishing. Polymer structuring the Covergloss® coating clay increased its scattering coefficient from 154 to 175. This significant improvement in opacity was not achieved at the expense of gloss properties as % paper gloss was maintained while 75° varnish gloss and print gloss were both improved.

Tables VI–VIII disclose that the addition of a high solids (>62%) polymer structured pigment has a desirable effect on opacity without a detrimental effect on gloss on the coating composition to which it is added. Further, the addition of such a high solids polymer structured pigment has a positive effect on the high-shear rheological properties of the coating composition as compared to the addition of conventional structured pigments such as calcined clays (e.g., Hycal® calcined clay). It is significant to note that desirable physical properties were obtained in the examples where the polymer structured clays comprised 100% by weight of the total pigment content in the coating composition.

Table IX compares the coating performance properties of coatings prepared with a 50/50 blend of polymer treated Covergloss® clay slurry and Covercarb® ground calcium carbonate (Sample W) and a 50/50 blend of untreated Covergloss® clay slurry and Covercarb®g ground calcium carbonate (Sample X). Sample W was prepared by polymer treating 65% solids Covergloss clay slurry with 0.038% CPS B50-LV followed by the addition of 0.056% of N sodium silicate. Covercarb (produced by Omya) is an ultrafine coating grade, ground calcium carbonate (GCC) pigment having a median particle size of about 0.7 micron and a BET surface area value of about 9 m$^2$/gm. The treated Covergloss pigment was then combined with a 50/50 blend with Covercarb GCC to produce Sample W. The binder and additives consisted of 12 parts Dow 620 SBR latex, 3 parts PG-280 hydroxyethylated starch, 1 part Nopcote C-104 calcium stearate lubricant, 0.1 part Sunrez 700C insolubilizer and 0.5 part Tinopal optical brightener. The pH was adjusted to 8.5 with NH$_4$OH. Dewatering measurements were performed on the AA-GWR apparatus using a contact time of 0.2 seconds. The coatings were applied to a 53 lb/R Westvaco basestock on the CLC-6000 pilot coater with a coat weight of approximately 10 lb/R. Data pertaining to the coating colors are given in Table IX. The coated sheets were calendered 2 nips at 1700 psi, 140 F and speed=5. The coated sheet performance data is also provided in Table IX.

TABLE IX

| Coating Color Data | | |
|---|---|---|
|  | W 50% Treated Covergloss 50% CaCO$_3$ | X 50% Covergloss 50% CaCO$_3$ |
| Pigment Visc. | | |
| % Solids | 68.3 | 70.6 |
| Bookfield - 20 rpm (cps) | 1920 | 2150 |
| Hercules A-bob, 1100 rpm (dynes) | 18 @ 495 rpm | 18 @ 330 rpm |
| Binder | | |
| Dow 620 Latex | 12 | 12 |
| PG 280 Starch | 3 | 3 |
| Coating Visc. | | |
| % Solids | 63.5 | 65.4 |
| pH | 9.1 | 8.9 |
| Brookfield-20 rpm (cps) | 1800 | 2600 |
| Brookfield-100 rpm (cps) | 640 | 920 |
| Hercules E-bob, 4400 rpm, (dynes) | 8.42 | 12.45 |
| AA-GWR g H$_2$O × 1000 | 10.3 | 8.6 |
| Results for coat weight of 10.0 lb/R | | |
| Coating | W | X |
| Opacity | 87.14 | 86.47 |
| Paper Gloss | 73.46 | 71.91 |
| Print Gloss @ 1.5 OD | 82.00 | 79.26 |
| Brightness | 84.20 | 83.09 |
| Fluorescence | 1.77 | 1.95 |
| Whiteness | 72.52 | 71.94 |
| Yellowness | 4.27 | 4.38 |
| "L" | 93.51 | 93.38 |
| "a" | −0.02 | −0.04 |
| "b" | 2.77 | 2.84 |
| PPS @ 5 KGF | 1.30 | 1.39 |
| PPS @ 10 KGF | 0.91 | 0.95 |
| PPS @ 20 KGF | 0.57 | 0.68 |
| IGT-m- oil (cm/sec) | 116 | 137 |
| K&N: % Ret. | 88.53 | 90.62 |
| Coat Weight (3300 ft$^2$) | 10.0 | 10.0 |

Table IX shows that replacing untreated Covergloss clay with a polymer treated Covergloss pigment in a 50/50 blend composition with Covercarb ground calcium carbonate simultaneously improves opacity, printed gloss and paper gloss of a paper coating composition. To obtain desirable results, the polymer treated pigment should comprise at least about 20% by weight of the total pigment content in the coating composition.

Table X compares the coating performance properties of coatings prepared with a 70/30 blend of polymer treated Lithoprint® clay slurry and Hydrasperse® clay (Sample Z) and a 70/30 blend of untreated Lithoprint® clay slurry and Hydrasperse® clay (Sample Y). Hydrasperse kaolin clay is a standard #2 coating clay that has the following approximate physical properties: a TAPPI Brightness % of 86–87.5, a particle size distribution, % finer than 2 microns of 80–86, a screen residue, 325 mesh (max) % of 0.005, and a pH (28% solids) of 6.0–8.0. Sample Z was prepared by polymer treating the Lithoprint clay with 0.09% B50-LV followed by the addition of 0.10% N-sodium silicate at ~65% slurry solids. The binders and additives in Samples Y and Z consisted of 9 parts Dow 620 SBR latex, 7 parts PG 280 hydroxyethylated starch, 1 part Nopcote C-104 calcium stearate lubricant and 0.35 part Sunrez 700C insolubilizer. The coatings were applied to a 27 lb/R Weyerhaeuser groundwood basestock at coat weights of approximately 5 and 7 lb/R. The coated sheets were calendered 2 nips at 1000 psi, 160 F and speed=6. Following the testing of all samples, the data was normalized to coat weights of 5, and 7 lb/R.

TABLE X

|  | Y | Z |
|---|---|---|
| Coating Results for coat weight of 5 lb/R | | |
| Opacity | 80.6 | 81.8 |
| Paper Gloss | 49.3 | 50.1 |
| Print Gloss @ 1.8 OD | 67.7 | 67.4 |
| Missing Dots | 126 | 120 |
| Brightness | 70.3 | 71.0 |
| "L" | 87.8 | 88.1 |
| "a" | −0.24 | −0.25 |
| "b" | 6.4 | 6.2 |
| Whiteness | 45.0 | 46.4 |
| Yellowness | 10.4 | 10.0 |
| PPS @ 5 KGF | 2.40 | 2.34 |
| PPS @ 10 KGF | 1.97 | 1.93 |
| PPS @ 20 KGF | 1.57 | 1.54 |
| IGT - LOW - oil (cm/ft$^2$) | 154 | 152 |
| K&N: % Ret. | 90.5 | 89.0 |
| Coating Results at coat weight of 7 lb/R | | |
| Opacity | 82.6 | 83.8 |
| Paper Gloss | 56.0 | 57.9 |
| Print Gloss @ 1.8 OD | 72.8 | 73.5 |
| Missing Dots | 102 | 96 |
| Brightness | 71.1 | 71.9 |
| "L" | 88.2 | 88.5 |
| "a" | −0.28 | −0.24 |
| "b" | 6.3 | 5.9 |
| Whiteness | 46.2 | 48.2 |
| Yellowness | 10.2 | 9.6 |
| PPS @ 5 KGF | 2.06 | 1.91 |
| PPS @ 10 KGF | 1.62 | 1.58 |
| PPS @ 20 KGF | 1.25 | 1.16 |
| IGT - LOW - oil (cm/ft$^2$) | 169 | 163 |
| K&N: % Ret. | 91.4 | 89.4 |
| Coating Color Viscosity Results | | |
| % Solids | 60.6 | 60.5 |
| Brookfield - 20 rpm (cps) | 3150 | 4000 |
| Brookfield - 100 rpm (cps) | 1140 | 1420 |
| Hercules E-bob, 4400 rpm (dynes) | 8.8 | 11.8 |

Table X shows that the polymer structured Lithoprint clay delivered improved opacity while providing equal or even slightly improved paper gloss and printed gloss properties as compared to the control at applied weights of 5 lb/Ream and 7 lb/Ream respectively.

The present invention may be embodied in other specific forms without departing from the spirit or essential attributes thereof and accordingly reference should be made to the appended claims rather than to the foregoing specification as indicating the scope of the invention.

What is claimed is:

1. A coating composition for paper or paperboard products comprising: a structured pigment including a plurality of chemically treated mineral particles, said mineral particles having a Malvern median particle size of about 0.3 to about 3.5 microns, the Malvern median particle size of said treated particles being less than 20% greater than the Malvern median particle size of said mineral particles prior to treatment, said mineral particles having been chemically treated with a polycationic polymer in an amount of from about 0.01% to about 0.20%, by weight.

2. The coating composition of claim 1 wherein said polycationic polymer has a molecular weight of less than 50,000.

3. The coating composition of claim 2 herein said polycationic polymer has a molecular weight of less than 15,000.

4. The coating composition of claim 3 wherein said polycationic polymer is a dimethylamine epichlorohydrin based polymer.

5. The coating composition of claim 1 wherein said structured pigment does not have a detrimental effect on sheet gloss of said coating composition.

6. The coating composition of claim 5 wherein said structured pigment comprises 100% by weight of the total pigment content in said coating composition.

7. The coating composition of claim 5 wherein said coating composition contains an additional pigment and wherein said structured pigment comprises at least 20% by weight of the total pigment content of said coating composition.

8. The coating composition of claim 5 wherein said coating composition contains an additional pigment and wherein said structured pigment comprises at least 50% by weight of the total pigment content of said coating composition.

9. The coating composition of claim 5 wherein said structured pigment has a positive effect on opacity of said coating composition.

10. The coating composition of claim 1 wherein said coating composition has a paper gloss value of greater than 45%.

11. The coating composition of claim 10 wherein said structured pigment comprise 100% of the total pigment content in said coating composition.

12. The coating composition of claim 10 wherein said coating composition contains at least one additional pigment and wherein said structured by pigment comprises at least 20% by weight of the total pigment content of said coating composition.

13. The coating composition of claim 1 wherein said structured pigment is in slurry form and includes greater than 62% solids by weight and a has a Brookfield viscosity at 20 rpm of less than 500 cps.

14. The coating composition of claim 13 wherein said structured pigment has an A-Bob Hercules Viscosity of better than 18 dynes at 500 rpm.

15. The coating composition of claim 13 wherein said structured pigment does not have a detrimental effect on sheet gloss of said coating composition.

16. The coating composition of claim 15 wherein said structured pigment has a positive effect on opacity of said coating composition.

17. The coating composition of claim 13 wherein said coating composition has a paper gloss value of greater than 45%.

* * * * *